United States Patent [19]
Bradstreet

[11] Patent Number: 5,880,744
[45] Date of Patent: Mar. 9, 1999

[54] METHOD AND APPARATUS FOR VECTOR TRANSFORMATION INVOLVING A TRANSFORMATION MATRIX

[75] Inventor: John Bradstreet, Seattle, Wash.

[73] Assignee: Microsoft Corporation, Redmond, Wash.

[21] Appl. No.: 884,510

[22] Filed: Jun. 27, 1997

[51] Int. Cl.$^6$ ........................................... G06T 1/60

[52] U.S. Cl. .................... 345/507; 345/427; 345/431; 382/167; 382/276

[58] Field of Search ..................................... 345/199, 507, 345/427, 431, 438, 439, 153, 155, 501; 382/167, 276, 298; 358/512, 515, 518

[56] References Cited

U.S. PATENT DOCUMENTS

| | | | |
|---|---|---|---|
| 5,070,413 | 12/1991 | Sullivan et al. | 358/456 |
| 5,432,893 | 7/1995 | Blasubramanian et al. | 345/431 |
| 5,568,596 | 10/1996 | Cawley | 395/131 |

OTHER PUBLICATIONS

Fast Convolution with Packed Lookup Tables; George Wolberg and Henry Massalin; vol. VIII.3, pp. 447–46.

*Primary Examiner*—Kee M. Tung

*Attorney, Agent, or Firm*—Leydig, Voit & Mayer, Ltd

[57] ABSTRACT

A method and apparatus is provided for an efficient way to perform a transformation of vectors, such as color vectors of pixels in a digital image. The transformation involves the sequential operation of a set of input functions, a transformation matrix, and a set of output functions on an input vector to generate an output vector. For a given matrix, a plurality of look-up tables are generated, each look-up table is associated with a vector element and stores words each corresponding to a possible value of the associated vector element. Each word in a look-up table has multiple segments, and each segment represents the product of a matrix element and the result of operation of a respective input function on the possible value of the associated vector element. For a given input vector, the look-up tables are referenced to obtain words corresponding to the values of the input vector elements. The words obtained from the look-up tables are added to produce a resultant word. The resultant word is then parsed into segments, and the segments are passed through respective output functions to derive respective elements of the output vector.

25 Claims, 6 Drawing Sheets

| c0 | 0 | 10 | 11 | 21 | 22 | 31 | |
|---|---|---|---|---|---|---|---|
| 0 | a*fin0(0)*SC0+sha | | c*fin0(0)*SC1+shc | | g*fin0(0)*SC2+shg | | |
| 1 | a*fin0(1)*SC0+sha | | c*fin0(1)*SC1+shc | | g*fin0(1)*SC2+shg | | |
| 2 | a*fin0(2)*SC0+sha | | c*fin0(2)*SC1+shc | | g*fin0(2)*SC2+shg | | |
| ⋮ | ⋮ | | ⋮ | | ⋮ | | ACG[C0] |
| n | a*fin0(n)*SC0+sha | | c*fin0(n)*SC1+shc | | g*fin0(n)*SC2+shg | | —108 |
| ⋮ | 102 ⋮ | | 104 ⋮ | | 106 ⋮ | | ←82 |

| c1 | | | | | | | |
|---|---|---|---|---|---|---|---|
| 0 | b*fin1(0)*SC0+shb | | d*fin1(0)*SC1+shd) | | h*fin1(0)*SC2+shh | | |
| 1 | b*fin1(1)*SC0+shb | | d*fin1(1)*SC1+shd) | | h*fin1(1)*SC2+shh | | |
| 2 | b*fin1(2)*SC0+shb | | d*fin1(2)*SC1+shd) | | h*fin1(2)*SC2+shh | | |
| ⋮ | ⋮ | | ⋮ | | ⋮ | | BDH[C1] |
| n | b*fin1(n)*SC0+shb | | d*fin1(n)*SC1+shd) | | h*fin1(n)*SC2+shh | | ←84 |
| ⋮ | ⋮ | | ⋮ | | ⋮ | | |

| c2 | | | | | | | |
|---|---|---|---|---|---|---|---|
| 0 | e*fin2(0)*SC0+she | | f*fin2(0)*SC1+shf | | i*fin2(0)*SC2+shi | | |
| 1 | e*fin2(1)*SC0+she | | f*fin2(1)*SC1+shf | | i*fin2(1)*SC2+shi | | |
| 2 | e*fin2(2)*SC0+she | | f*fin2(2)*SC1+shf | | i*fin2(2)*SC2+shi | | |
| ⋮ | ⋮ | | ⋮ | | ⋮ | | EFI[C2] |
| n | e*fin2(n)*SC0+she | | f*fin2(n)*SC1+shf | | i*fin2(n)*SC2+shi | | ←80 |
| ⋮ | ⋮ | | ⋮ | | ⋮ | | |

| c3 | | | | | | | |
|---|---|---|---|---|---|---|---|
| 0 | x*fin3(0)*SC0+shx | | y*fin3(0)*SC1+shy | | z*fin3(0)*SC2+shz | | |
| 1 | x*fin3(1)*SC0+shx | | y*fin3(1)*SC1+shy | | z*fin3(1)*SC2+shz | | |
| 2 | x*fin3(2)*SC0+shx | | y*fin3(2)*SC1+shy | | z*fin3(2)*SC2+shz | | XYZ[C3] |
| ⋮ | ⋮ | | ⋮ | | ⋮ | | ←86 |
| n | x*fin3(n)*SC0+shx | | y*fin3(n)*SC1+shy | | z*fin3(n)*SC2+shz | | |
| ⋮ | ⋮ | | ⋮ | | ⋮ | | |

FIG. 4

METHOD AND APPARATUS FOR VECTOR TRANSFORMATION INVOLVING A TRANSFORMATION MATRIX

FIELD OF THE INVENTION

This invention relates generally to computer-implemented numerical processing of digital data, and more particularly to a computer-implemented transformation of vectors that involves a transformation matrix.

BACKGROUND OF THE INVENTION

Interactive computer graphics is the most important means of producing pictures since the invention of photography and television. With the aid of a computer, digitized images can be edited to achieve a variety of effects such as changing the shapes and colors of objects, forming composite images, and correcting defects in the images.

Until recently, real-time editing of digital graphic images was feasible only on expensive high-performance workstations with dedicated, special-purpose, hardware. The progress of integrated circuit technology in recent years has produced microprocessors with significantly improved processing power and has also reduced the costs of computer memories. These developments have made it feasible now to provide advanced graphic editing capabilities in computer software designed for personal computers. As a result, the software industry sees a booming growth of computer graphics applications for personal computers.

One challenge constantly facing the designers of computer graphics applications is the need to reduce the amount of computer processing required to perform the graphic editing operations. Digital image editing is calculation-intensive. This is because a digital image typically contains from hundreds of thousands to millions of pixels. Even a simple editing operation may require the modification of many pixels, and the computing time can become unacceptably long if many calculational steps are required to modify each pixel in the image. This concern of calculational efficiency is especially significant for graphic applications operating on personal computers, due to the relatively restricted calculating power of such machines.

For example, many common operations that manipulate the colors of a digital image involve generally the transformation of the color vector of each image pixel from one point in the color space to another according to a transformation matrix. Examples of such operations include changing the tint of the image, altering the contrast and brightness, and colorizing black and white (or even color) images. Such a matrix transformation requires calculating the product of the color vector of the pixel being modified with the transformation matrix, which involves a series of multiplication and summation operations. Thus, many calculational steps have to be performed for transforming the color vector of each pixel, and the computing time required to transform the entire image can be very long. As a result, the application can become unacceptably slow in responding to editing instructions entered by the user. This is highly undesirable in view that the flexibility and responsiveness of the user interface is a key factor to the commercial success of graphics software designed for the personal computer market.

Matrix transformations are widely used in many areas of digital data processing besides image color transformation for a large number of different effects. Examples include spatial coordinate transformation and digital filtering. Accordingly, an efficient implementation of a general matrix transformation is needed in many different fields of digital data processing.

SUMMARY OF THE INVENTION

In accordance with the invention, a method and apparatus is provided for transforming an input vector into an output vector according to a general transformation which includes the sequential operation of a set of input functions operating on respective vector elements, a transformation matrix, and a set of output function operating on respective vector elements. The input and output functions may be non-linear functions, and in a particularly simple case may be identity functions. For a given transformation matrix and given input functions, a plurality of look-up tables are generated. Each look-up table is associated with one vector element and a corresponding column of the transformation matrix. Each look-up table contains a plurality of words each corresponding to a possible value of the associated vector element. Each word has a plurality of segments each representing the product of a matrix element in the associated column and a result of the operation of a respective input function on the possible value of the vector element.

After the look-up tables are set up, the transformation is performed on the input vector. For each element of the input vector, an associated look-up table is referenced to obtain a word corresponding to the specific value of that vector element. The words obtained from the look-up tables for the input vector are added to produce a resultant word which has segments corresponding to the segments of the words from the look-up tables. The resultant word is parsed into its segments, and selected elements of the output vector are derived from the respective segments of the resultant word as a result of operation of a respective output function.

The processing steps involved in the general vector transformation are significantly simplified, and the computing time for the transformation is significantly reduced, by extensive use of look-up tables in the calculations, and by performing the calculations for different elements of the transformed vector in parallel. The invention takes advantage of the fact that the width of the processor (e.g., 32 bits) at least multiple times of the required width of each element (e.g., 8 bits) of the outpuut vector. This allows multiple output vector elements to be calculated in parallel.

In a preferred embodiment, the efficient implementation of vector transformation according to the invention is used in transforming the colors of a digital color image. The digital image has multiple pixels each described by a color vector, which has vector elements each representing a color channel (e.g., red, green, blue, or transparency). The transformation matrix and the input and output functions provide the means for performing a variety of color editing functions such as changing the tint, contrast, brightness, and other effects.

Due to the general form of the vector transformation, the transformation implemented according to the invention can also be advantageously used in other areas of digital processing besides graphic color editing. It will be appreciated that the invention is applicable in a variety of cases where the width of the resulting data elements is a small fraction of the width of the processor ALU. Examples of possible applications include spatial transformations and digital filtering (e.g., convolution) of data.

Additional features and advantages of the present invention will become apparent with reference to the following detailed description when taken in conjunction with the drawings in which:

BRIEF DESCRIPTION OF THE DRAWINGS

FIG. 4 is a block diagram of data structures of selected look-up tables shown in FIG. 3;

Figure 1:
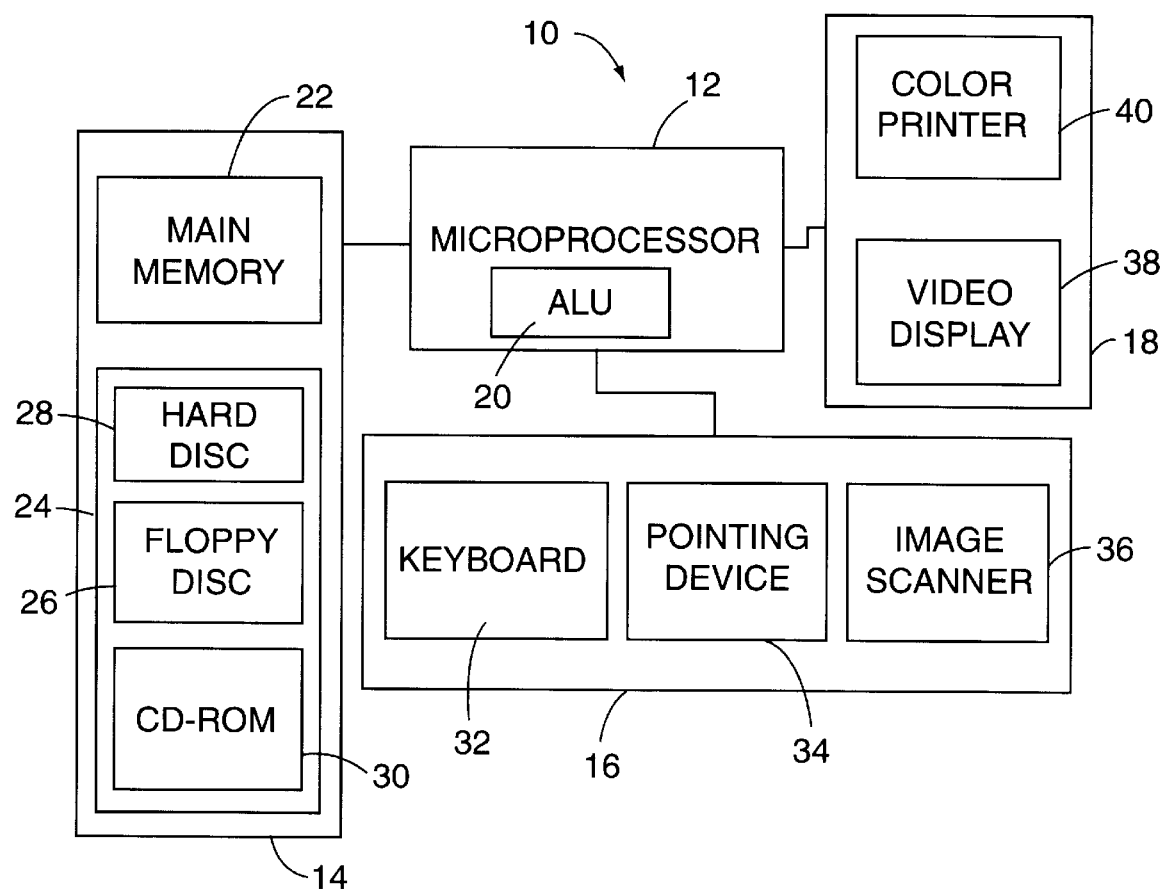
FIG. 1 is a block diagram of a computer system that may be used to implement a method and apparatus for implementing a general vector transformation according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows an exemplary operating environment for an embodiment of the present invention which includes a personal computer system. The personal computer 10 includes a microprocessor 12, a memory system 14, input devices 16 and output devices 18.

The microprocessor 12 is of familiar design and includes an ALU 20 for performing arithmetic and logic computations. The microprocessor 12 may have any of a variety of architectures known to those skilled in the art. Preferably the architecture of the microprocessor has a processor word-width that is at least 32-bit wide.

The memory system 14 generally includes a high-speed main memory 22 in the form of random access memory (RAM) which will be used by the microprocessor in the graphic editing process. The memory system further includes secondary storage 24 which may be used for long-term storage of graphic editing applications and digital images. The secondary storage typically includes floppy disks 26, hard disks 28, CD-ROM 30, and may contain a variety of alternative storage components having a variety of storage capacities.

The input devices 16 may include familiar components such as a keyboard 32 and a pointing device 34 (e.g., a mouse). For image processing purposes, the computer system may include devices for inputting digitized images, such as a color image scanner 36. The output devices 18 may also include a variety of different components. For computer graphics applications, the output devices may include a color video display 38 on which an image being edited can be displayed for viewing, and a color printer 40 for producing a hard copy of the digital image.

Figure 2:
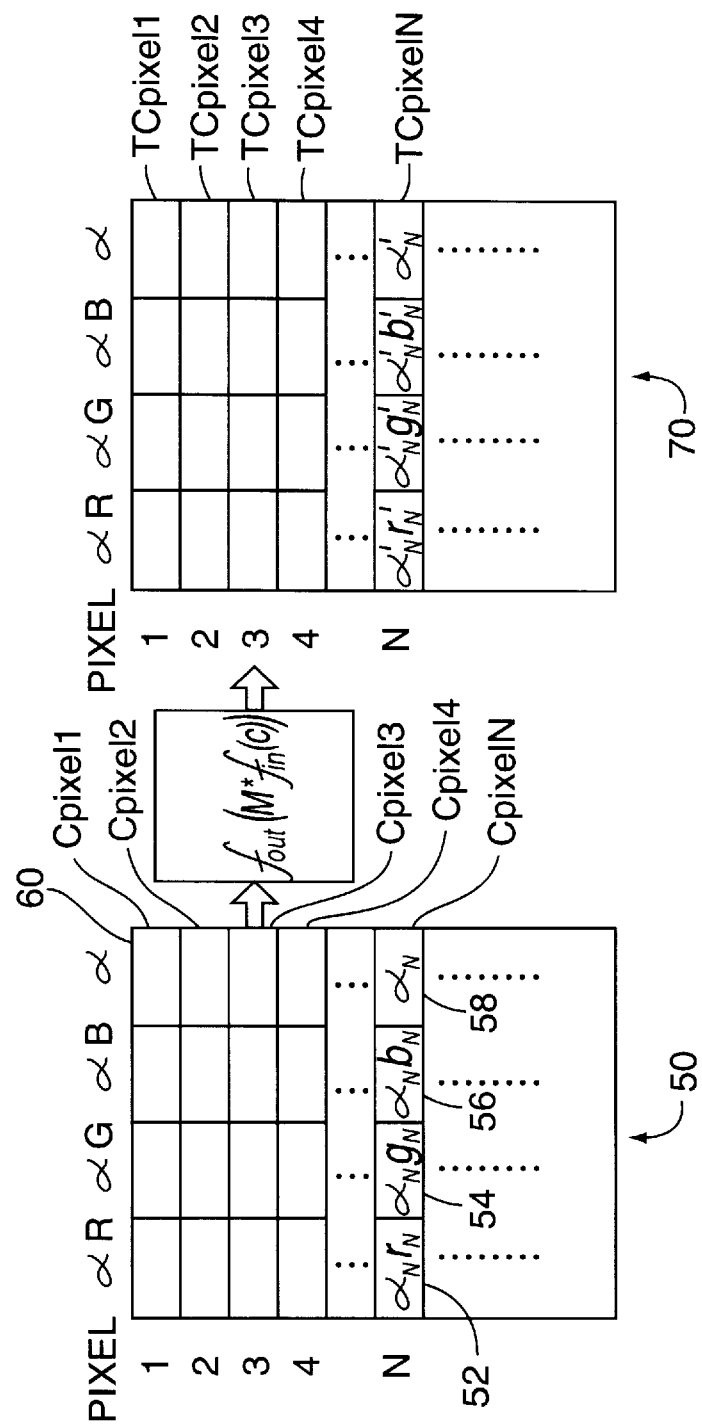
FIG. 2 is a block diagram of data structures of the color data of a digital image to be edited and the color data of the image after being transformed by a general transformation which includes an input function set, a transformation matrix, and an output function set.

Turning now to FIG. 2, the present invention is generally related to a computer implementation of a transformation of input vectors into output vectors, and in the following description the application of editing colors in a digital image is used to illustrate the invention. A digital image 50 to be edited may be viewed conceptually as comprising a plurality of pixels. Each pixel has associated color data defining how that pixel should represented when displayed on the video display or printed by the printer. Such color data are typically specified in the form of a color vector in a predefined color space. In the illustrated data structure, the color data of the digital image 50 to be edited is shown as a sequence of color vectors Cpixel1, Cpixel2, . . . . It will be appreciated that the actual data structures used in a given computer system for storing the digital image will depend on the specific graphic application and on the format chosen, as known by those skilled in the art.

For illustration purposes, the invention will be described with respect to an image in which the color of each pixel is defined by a color vector in the RGBα color space. It will be appreciated, however, that the described embodiment is not limited only to color transformations in the RGBα color space, but can be advantageously used with many other color spaces and for transformation between those spaces. For example, the embodiment for transforming the RGBα image as described below can be readily used for transforming images defined in the YCCα and YCbCrα color spaces.

As illustrated in FIG. 2, the RGBα color vector of a given pixel N has four elements 52, 54, 56, 58 corresponding respectively to red (R), green (G), blue (B), and alpha (α). The R, G, B elements represent intensities of the associated colors in the familiar RGB gamut. The value of the alpha element in the color vector represents the transparency of that pixel, and the collection of the alpha values of the image is often called the alpha channel 60. In the preferred embodiment, the value of each element in the RGBα color vector is represented by an 8-bit integer, with the integer value of 0 corresponding to the value 0 in the color space, and the integer value of 255 corresponding to the value of 1.0 in the color space. The four 8-bit elements of a color vector can be conveniently stored as one 32-bit word. On computers with greater processor word length, the bit-width of the color vector elements can be increased to provide improved color resolution.

In the preferred embodiment, the color vector for each pixel is alpha-premultiplied, i.e., the values of the R, G, B, α elements stored in the color vector CpixelN are $\alpha_N r_N$, $\alpha_N g_N$, $\alpha_N b_N$, $\alpha_N$, respectively, where $R_N$, $g_N$, $b_N$ are the red, green, and blue values of pixel N in the RGB space, and $\alpha_N$ is the transparency value of pixel N. Storing the colors of the image pixels in the alpha pre-multiplied format simplifies calculations involved in compositing and anti-aliasing operations.

In accordance with the invention, the vector transformation has a general form of:

$$TC = F(C) = f_{out}(M * f_{in}(C)),$$

where C is an input vector to be transformed, TC is the output or transformed vector. In the transformed image 70, the colors of the pixels 1, 2, . . . are defined by color vectors TCpixel1, TCpixel2, . . . F is the general transformation, M is a transformation matrix, $f_{in}$ is a set of input transformation functions which modify the values of the vector elements of the vector C, $f_{out}$ is a set of output transformation functions which modify the values of the elements of the vector $M * f_{in}(C)$.

Each of the function sets $f_{in}$ and $f_{out}$ includes a plurality of functions each for operation on one vector element. For instance, in the described embodiment for transforming RGBα color vectors, the input function set $f_{in}$ includes functions $f_{in}0(C0)$, $f_{in}1(C1)$, $f_{in}2(C2)$, and $f_{in}3(C3)$, which operate respectively on the vector elements C0, C1, C2, and C3 of the input vector C. Likewise, the output function set $f_{out}$ includes functions $f_{out}0(D0)$, $f_{out}1(D1)$, $f_{out}2(D2)$, and $f_{out}3(D3)$, which operate respectively on the vector elements D0, D1, D2, D3 of the vector $D=M*f_{in}(C)$.

In certain common color-transformation operations, the input and output transformation functions may be nonlinear functions. An example of common nonlinear transformations is the clamping of the calculated results into a valid data range. In certain applications, the input and output functions may be identity functions, i.e., $f_{in}(C)=C$ and $f_{out}(D)=D$.

If the elements of the color vectors C and TC and the matrix M are defined as:

$$C = [C0, C1, C2, C3];$$

$$TC = [TC0, TC1, TC2, TC3];$$

$$M = \begin{pmatrix} a & b & e & x \\ c & d & f & y \\ g & h & i & z \\ j & k & l & s \end{pmatrix},$$

and a vector C' is defined as:

$$\begin{aligned} C' &= [C'0, C'1, C'2, C'3,] = f_{in}(C) \\ &= [f_{in}0(C0), f_{in}1(C1), f_{in}2(C2), f_{in}3(C3)], \end{aligned}$$

then $$tc0 = f_{out}0(a*c'0+b*c'1+e*c'2+x*c'3);$$

$$tc1 = f_{out}1(c*c'0+d*c'1+f*c'2+y*c'3);$$

$$tc2 = f_{out}2(g*c'0+h*c'1+i*c'2+z*c'3);$$

$$tc3 = f_{out}3(j*c'0+k*c'1+l*c'2+s*c'3),$$

where c'0, c'1, c'2, c'3 are the respective values of the vector elements C'0, C'1, C'2, and C'3, and tc1, tc2, tc3, and tc3 are the respective values of the transformed vector elements TC0, TC1, TC2, and TC3.

It can be seen that if the calculation of the matrix product is carried out by performing each of the multiplication and summation operations in the expressions above, the transformation of the color vector of each pixel requires many calculational steps. The time required to generate the transformed image in such a way can be rather substantial. In other words, the response of the graphic application to editing commands involving transformation by a matrix can be quite slow.

The present invention provides a method and apparatus that significantly simplifies and reduces the operations required to transform the color vector of each image pixel. Instead of actually performing all of the multiplication and summation operations for each pixel, the present invention makes extensive use of look-up tables to obtain the results of multiplication of elements of the transformation matrix M with the elements of the color vector of a given pixel.

More particularly, for a given transformation matrix, a plurality of look-up tables are generated. Each of those look-up tables is associated with an element of the color vector and contains the results of multiplication of selected transformation matrix elements with the input-transformed color vector element for all possible values of that vector element. Using look-up tables to handle the calculations is advantageous because the relatively time-consuming multiplication operations are replaced by simple look-up operations, and the data to be transformed is organized in a manner in accordance with the invention to exploit the efficiency of parallel calculations.

It will be appreciated that the overhead of generating the look-up tables is relatively small as compared to the saving in computer time for transforming the image. This is because each element of a color vector typically has only a relatively small number of possible values. For example, in the preferred embodiment, each element of the RGBα color vector has eight (8) bits, corresponding to only 256 possible values. Thus, the size of each look-up table is rather small. Moreover, once the look-up tables are set up, they are used in transforming a large number of image pixels. A color editing operation typically affects many thousands or even millions of image pixels. By simplifying the operations required for transforming each pixel, the present invention allows for significantly faster response to editing instructions entered by the user.

In accordance with a feature of the present invention, the speed of the color transformation is further significantly improved by carrying out the calculations for different elements of the transformed color vector in parallel. The present invention takes advantage of the fact that the bit-width of the color vector elements is typically much smaller than that of the processor. For instance, in the described embodiment each color vector element has only 8 bits, while the processor word has a width of 32 bits. Accordingly, the products of more than one matrix element with an input-transformed color vector element can fit in one word. In other words, each word in a look-up table provides the multiplication results of several matrix elements with the result of operation of a respective input function on a give possible value of the associated color vector element.

The advantageous use of look-up tables and parallel operations in the preferred embodiment will now be described. In the preferred embodiment, it is assumed that the elements j, k, and l of the transformation matrix M are zero (0). By setting j, k, and l to zero, the transparency value (α) of a pixel will not be mixed with the R, G, B values as a result of the color transformation. Under this assumption, the elements of the vector TC become:

$$tc0 = f_{out}0(a*c'0+b*c'1+e*c'2+x*c'3);$$

$$tc1 = f_{out}1(c*c'0+d*c'1+f*c'2+y*c'3);$$

$$tc2 = f_{out}2(g*c'0+h*c'1+i*c'2+z*c'3);$$

$$tc3 = f_{out}3(s*c'3).$$

These equations can be viewed from a different angle as in the following expression:

$$\begin{aligned} & [a, c, g] * c'0 \\ & [b, d, h] * c'1 \\ & [e, f, i] * c'2 \\ & + [x, y, z] * c'3 \\ \hline & [r0, r1, r2], \end{aligned}$$

$$tc0 = f_{out}0(r0),$$
$$tc1 = f_{out}1(r1),$$
$$tc2 = f_{out}2(r2),$$
and
$$tc3 = f_{out}3(s*c'3).$$

Since each of the color vector elements C0, C1, C2, and C3 has only 8 bits, the products of three elements of the transformation matrix and an element of C' (the result of operation of the input function set $f_{in}$ on the color vector C) can be fit into one 32-bit word.

Figure 3:
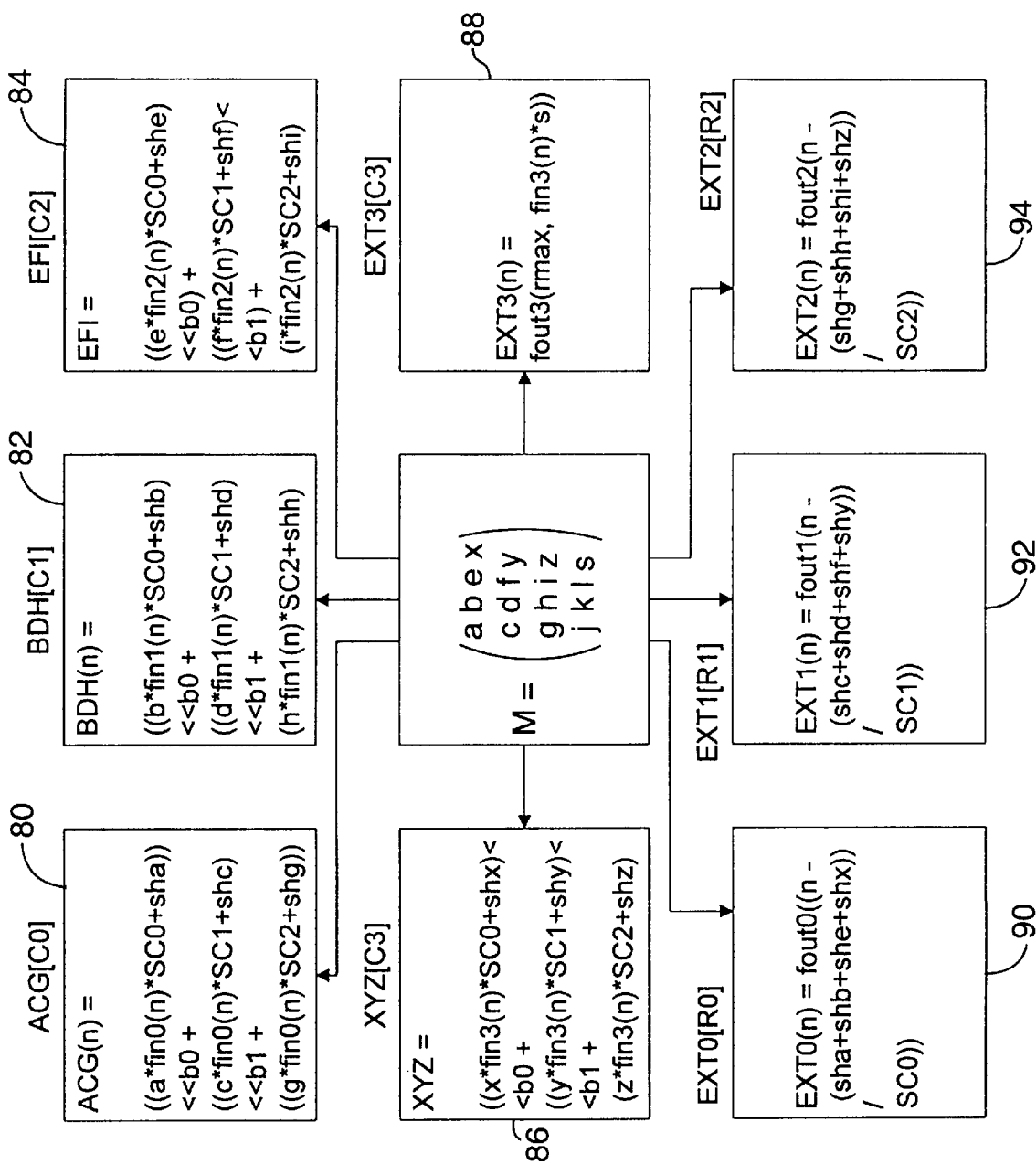
FIG. 3 is a block diagram showing look-up tables generated for transforming color vectors of an image.

Thus, in the preferred embodiment as shown in FIG. 3, a plurality of look-up tables, including ACG[C0] 80, BDE [C1] 82, EFI[C2] 84, XYZ[C3] 86, and EXT3[C3] 88 are generated and stored in the main memory 22 of the computer. In the look-up table ACG, each word corresponds to a possible value of C0 and contains segments representing respectively the results of multiplication of the matrix elements a, c, and g with the result of operation of $f_{in}0$ on the possible value of C0. In other words, each word in ACG contains the result of [a c g]*$f_{in}0$(c0) for a given possible value of c0. Similarly, the words in the look-up tables BDE, EFI, and XYZ contain, respectively, the results of [b d e]*$f_{in}1$(c1), [e f i]*$f_{in}2$(c2), [x y z]*$f_{in}3$(c3). The look-up table EXT3 provides the results of $f_{out}3$(s*$f_{in}3$ (c3)).

FIG. 3 also shows that in the preferred embodiment additional look-up tables EXT0[R0] 90, EXT1[R1] 92, and EXT2[R2] 94 are generated for the given transformation matrix M. The contents of these look-up tables and the way they are used in the color transformation process will become clear in the following description.

Turning now to FIG. 4, in the preferred embodiment, each 32-bit word in the look-up tables ACG, BDH, EFI, and XYZ is divided into three segments, with each segment providing the product of a matrix element with an input-transformed value of the associated color vector element. For instance, for a given integer value n of the vector element C0, there is a word ACG(n) 108 in the table ACG corresponding to n. The first segment 102 of the word ACG(n) provides the result of a*$f_{in}0$(n) Likewise, the second segment 104 and third segment 106 provide, respectively, the results of c*$f_{in}0$(n) and g*$f_{in}0$(n). In the preferred embodiment, the width of the words in the tables in ACG, BDH, EFI, XYZ are divided such that the first and second segments each has eleven (11) bits, and the third segment has ten (10) bits. This selection is made based on the consideration that the first, second, and third segments are used to calculate the intensities of red, green, and blue, respectively, and that the blue resolution is generally considered less visually important and hence can be computed with fewer bits of precision.

In accordance with an aspect of the invention, the look-up tables ACG, BDH, EFI, XYZ do not store directly the products of the matrix elements and the input-transformed color vector elements. For instance, the word ACG(n)108 is not formed as:

$$ACG[n]=((a*f_{in}0(n))<<b0+(c*f_{in}0(n))<<b1+(g*f_{in}0(n))),$$

where b0 and b1 are numbers of times the left shifting operation is to be performed to shift the respective products into the desired bit fields. More particularly, the product of a matrix element and the result of operation of a respective input function on a given value of a color vector element is first scaled and offset before being stored in the corresponding word segment in the look-up table. In general, the input transformation function allows the inclusion of some non-linear effects in the general vector transformation, the off-setting allows negative numbers of the matrix elements to be handled, and the scaling addresses the need to prevent overflow when segments of the words retrieved from the look-up tables are summed to calculate the elements of the transformed color vector.

In the preferred embodiment, for a given integer value n, the corresponding words in the tables ACG, BDH, EFI, and XYZ contain, respectively:

$$\begin{aligned}
ACG(n) &= ((a*f_{in}0(n)*SC0 + sha) << b0) + \\
&\quad ((c*f_{in}0(n)*SC1 + shc) << b1) + \\
&\quad ((g*f_{in}0(n)*SC2 + shg)); \\
BDH(n) &= ((b*f_{in}1(n)*SC0 + shb) << b0) + \\
&\quad ((d*f_{in}1(n)*SC1 + shd) << b1) + \\
&\quad ((h*f_{in}1(n)*SC2 + shh)); \\
EFI(n) &= ((e*f_{in}2(n)*SC0 + she) << b0) + \\
&\quad ((f*f_{in}2(n)*SC1 + shf) << b1) + \\
&\quad ((i*f_{in}2(n)*SC2 + shi)); \\
XYZ(n) &= ((x*f_{in}3(n)*SC0 + shx) << b0) + \\
&\quad ((y*f_{in}3(n)*SC1 + shy) << b1) + \\
&\quad ((z*f_{in}3(n)*SC2 + shz)),
\end{aligned}$$

where SC0, SC1, SC2, SC3 are scaling constants, and sha, shb, shc, shd, she, shf, shg, shh, shi, shx, shy, and shz are offset constants. The selection of the proper values of these scaling and offset constants will be described in greater detail below.

Figure 5:
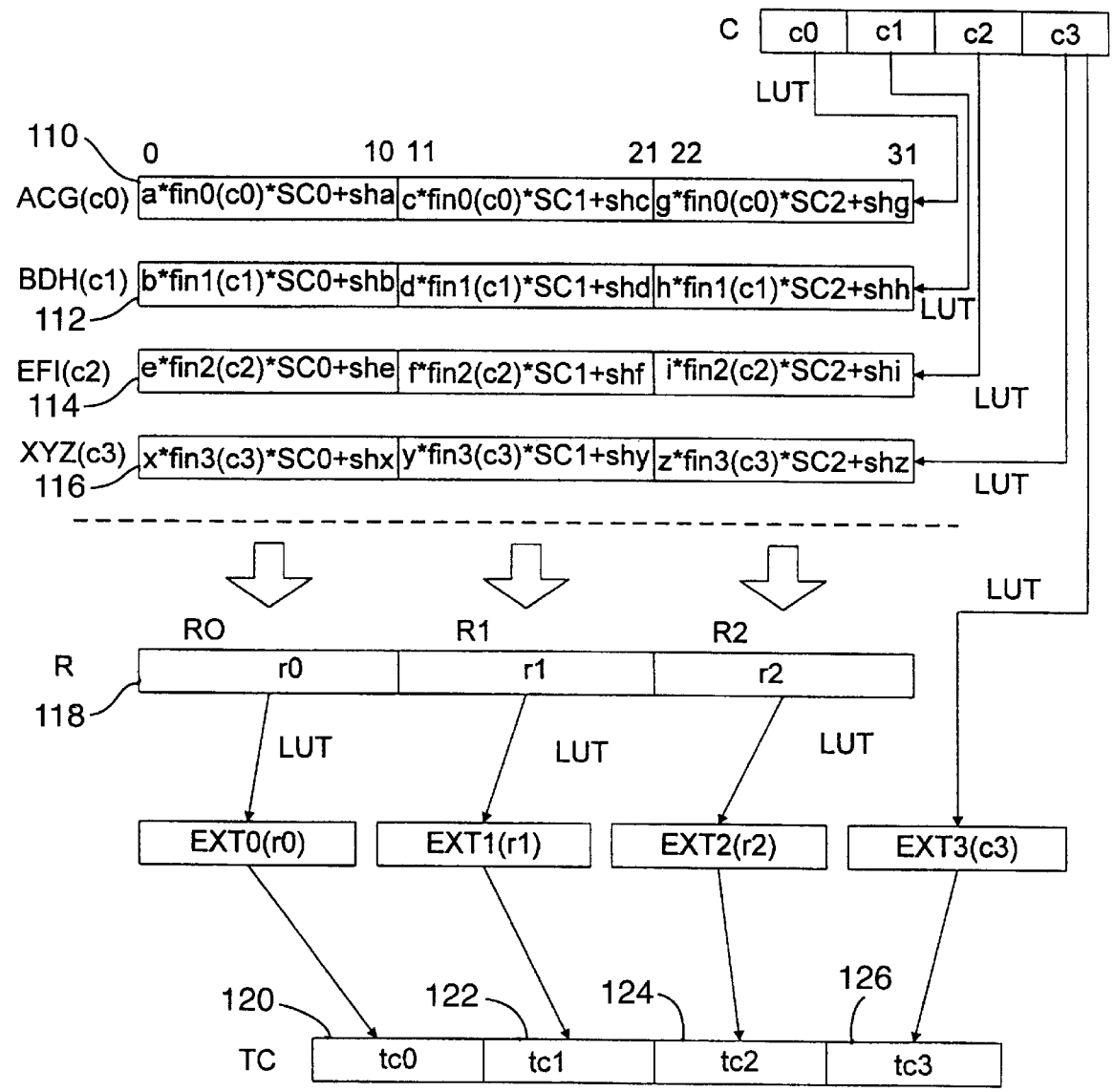
FIG. 5 is a block diagram of data structures involved in calculating the transformed color vectors of an image pixel using the look-up tables of FIG. 3.

After the look-up tables are set up, they can be used in the calculations of the color transformation. As shown in FIG. 5, for a color vector C=[C0, C1, C2, C3], the look-up tables are referenced to obtain the words ACG(c0), BDH(c1), EFI(c2), and XYZ(c3). A word R 118 can then be generated as:

$$R=ACG(c0)+BDH(c1)+EFI(c2)+XYZ(c3).$$

The word R contains three segments R0, R1, and R2 which have the same segment lengths as those in the words ACG[C0], BDH[C1], EFI[C2], and XYZ[C3]. The respective values r0, r1, and r2 of these three segments are given as:

$$r0=(a*f_{in}0(c0)+b*f_{in}1(c1)+e*f_{in}2(c2)+x*f_{in}3(c3))*SC0+sha+shb+she+shx;$$

$$r1=(c*f_{in}0(c0)+d*f_{in}1(c1)+f*f_{in}2(c2)+y*f_{in}3(c3))*SC1+shc+shd+shf+shy;$$

$$r2=(g*f_{in}0(c0)+h*f_{in}1(c1)+i*f_{in}2(c2)+z*f_{in}3(c3))*SC2+shg+shh+shi+shz.$$

From these segments of the word R, the values of the elements TC0, TC1, TC2, and TC3 of the transformed vector TC=$f_{out}$(M*$f_{in}$(C)) can be derived. More specifically, the respective values tc1, tc2, and tc3 of the first three elements of the vector TC are given as:

$$tc0=f_{out}0((r0-(sha+shb+she+shx))/SC0);$$

$$tc1=f_{out}1((r1-(shc+shd+shf+shy))/SC1);$$

$$tc2=f_{out}2((r2-(shg+shd+shi+shz))/SC2);$$

In accordance with a feature of the preferred embodiment, the derivation of the values of the elements TC0, TC1, and TC2 from the segments R0, R1, and R2 are also performed using look-up tables. As shown in FIG. 3, each entry in the look-up table in EXT0[R0] corresponds to a possible value of R0 and contains EXT0 [r0]=$f_{out}0$((r0−(sha+shb+she+shx))/SC0). Likewise, the tables EXT1[R1] and EXT2[R2] contain, respectively, entries EXT1[r1]=$f_{out}1$((r1−(shc+shd+shf+shy))/SC1), and EXT2(r2)=$f_{out}2$((r2−(shg+shd+shi+shz))/SC2).

The inclusion of the output transformation function set $f_{out}$ in the general vector transformation allows nonlinear operations on the results of the matrix product. For instance, the output functions may be used to first apply a non-linear transformation function $f_{NL}$ on the counter-shifted and rescaled results, and then provide the necessary clamping of the values of TC0, TC1, TC2 within the allowed range. In that case, $EXT0(r0) = max(0, min(rmax, f_{NL}0((r0-sha+shb+she+shx))/SC0));$ $EXT1(r1) = max(0, min(rmax, f_{NL}1((r1-(shc+shd+shf+shy))/SC1));$ $EXT2(r2) = max(0, min(rmax, f_{NL}2((r2-(shg+shd+shi+shz))/SC2)),$ where rmax is the maximum integer value allowed for each element of the transformed color vector. In the preferred embodiment, rmax=255. Thus, each entry in the tables EXT0, EXT1, and EXT2 has a smallest value of zero (0) and a largest value of 255. Similarly, the look-up table EXT3 can be used to provide clamping for the value tc3 of the transformed color vector element TC3 by setting the entries of EXT3 as:

$EXT3(c3) = max(0, min(rmax, f_{NL}3(s*fin3(c3))))$.

After the word R is formed by summing the words ACG(c0), BDH(c1), EFI(c2), and XYZ(c3), the words EXT0(R0) 120, EXT1(R1) 122, and EXT2(R2) 124, and EXT3(c3) 126 are retrieved from the respective look-up tables. The values of the elements of the transformed color vector TC are then obtained as:

tc0=EXT0[r0];
tc1=EXT1[r1];
tc2=EXT2[r2];
tc3=EXT3[c3].

As described above, scaling and offsetting are performed in generating the look-up tables ACG, BDH, EFI, and XYZ. The scaling constants SC0, SC1, and SC2 are preferably as large as possible to reduce round-off errors when the segments of the words from these tables are summed to produce the segments of the resultant word R. On the other hand, the scaling constants should be chosen such that the sum of one segment of the words from the look-up tables would not overflow into another segment.

Using the scaling constant SC0 as an example, the maximum value R0max of the first segment R0 of the word R is approximately:

$R0max = (abs(a)+abs(b)+abs(e)+abs(x))*SC0*f_{in}(C)_{max},$ where abs( ) is the absolute value function, and $f_{in}(C)_{max}$ is the maximum possible value resulting from the operation of the input function set $f_{in}$ on an element of the input vector C. The requirement is that R0max fit in the bit-width of the first segment R0 of R. Defining the number of bits in the first segment as Nbits[R0], then this requirement becomes:

$R0max < 2^{\wedge}Nbits[R0].$

Accordingly, SC0 is selected as:

$SC0 <= 2^{\wedge}Nbits[R0]/(f_{in}(C)_{max}*(abs(a)+abs(b)+abs(e)+abs(x)).$

The scaling constants SC1 and SC2 can be similarly selected.

After the scaling constants are selected, the offset constants can be set. Using the constant sha as an example, in the preferred embodiment sha is determined according to the following expressions:

if(a,0)
    $sha = -a*SC0*f_{in}(C)_{max}$
else
    sha = 0.

The other offset constants can be similarly set.

Figure 6:
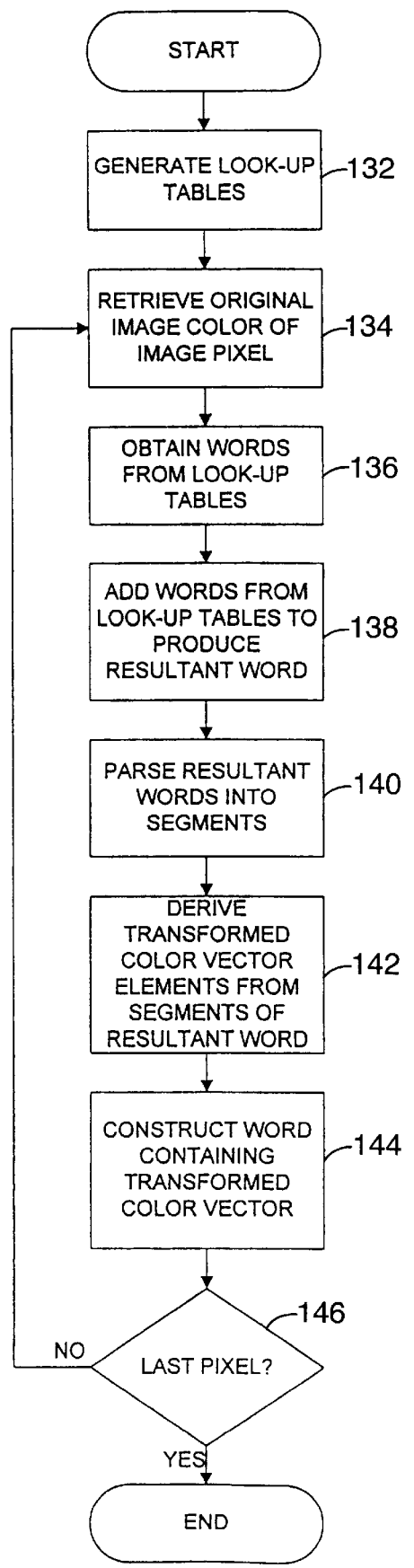
FIG. 6 is a flow diagram for a transformation process in accordance with the invention used in transforming colors of an image.

The steps of the embodiment for color transformation will now be summarized with reference to FIG. 6. For a given transformation matrix M and given input and output functions, a plurality of look-up tables are generated (step 132) for providing the results of products of the matrix elements and the input-transformed values of the input vector elements. In the embodiment described above, these look-up tables include ACG, BDH, EFI, XYZ, and EXT3. Each of the words in the tables ACG, BDH, EFI, and XYZ has multiple segments each representing the product of one matrix element and the result of operation of a respective input function on a given value of an element of the color vector. The look-up tables EXT0, EXT1, and EXT2 are also generated for the given transformation matrix and input and output functions.

After the look-up tables are generated, the color transformation operation is performed on the image being edited. The original color vector of a pixel in the image is retrieved from the memory of the computer (step 134). Words corresponding to the values of the elements of that color vector are then obtained from the look-up tables (step 136). In the described embodiment, for a vector C=[C0, C1, C2, C3], the multiple-segment words ACG(c0), BDH(c1), EFI(c2) and XYZ(c3) are retrieved from the respective look-up tables. These words are then added to produce a resultant word R (step 138).

The word R is then parsed into segments (step 140). In the present embodiment, the segments R0, R1, and R2 of the word R are obtained as:

$R0 = (R>>b0)$ & $((1<<Nbits[R0])-1);$ $R1 = (R>>b1)$ & $((1<<Nbits[R1])-1);$ $R2 = R$ & $((1<<Nbits[R2])-1),$ where in the preferred embodiment b0=21, b1=10, Nbits[R0] =11, Nbits[R1] =11, and Nbits[R2] =10.

After the word R is parsed into segments, the values of the selected elements of the transformed color vector TC are then derived from the segments of R (step 142). In the preferred embodiment, this involves checking the look-up tables EXT0, EXT1, and EXT2 to find the values of TC0, TC1, and TC2 corresponding to the values of R0, R1, and R2. The value of the element TC3 is obtained from the look-up table EXT3 according to the value of the input vector element C3. A word containing the transformed color vector TC of the pixel can then be generated from the values of the elements of TC by a few shifting and adding operations (step 144). After the word corresponding to the transformed color vector TC has been stored in the memory, the program checks whether the pixel being transformed is the last pixel in the image (step 146). If not, the program loops back to step 134 to retrieve the original color vector of another pixel of the image and calculates the transformed color vector of that pixel. The color transformation of the image is thus carried out pixel-by-pixel until the colors of all pixels in the image are transformed.

As can be appreciated from the foregoing detailed description, the invention provides a simple yet highly efficient way to implement a general vector transformation that involves sequential operation of a set of input functions, a transformation matrix, and a set of output functions. According to the invention, relatively small look-up tables with multiple-segment words are used to exploit the parallelism in the matrix transformation. Once the look-up tables are set up, they can be used to transform a large number of input vectors. By using look-up tables and parallel processing, the calculational steps for transforming each input vector are significantly simplified. In the preferred embodiment, color vectors of image pixels in a four-dimensional color space are transformed using look-up tables generated according to the invention. It will be appreciated, however, that the general vector transformation according to the invention is applicable in many other areas of data processing where the width of the resultant data elements is a fraction of the width of the processor. The highly efficient implementation of the general vector transformation makes it feasible to provide advanced and generally calculation intensive vector operations in a variety of applications designed to run on a computer of modest processing power, such as a personal computer.

What is claimed is:

1. A method of implementing in a computer a transformation of an input vector having multiple vector elements by sequential operation of a set of input functions operating on respective vector elements, a matrix, and a set of output functions operating on respective vector elements to generate an output vector, including the steps of:

generating in a memory of the computer a plurality of look-up tables each associated with an element of the input vector and a corresponding column of the matrix, each of said look-up tables comprising a plurality of words each corresponding to a possible value of said associated element of the input vector and having multiple segments each representing a product of a matrix element in said associated column of the matrix and a result of operation of a respective input function on said possible value of said associated element of the input vector;

obtaining from the look-up tables words corresponding to values of the respective elements of the input vector;

adding the words obtained from the look-up tables to generate a resultant word having segments corresponding to the segments of the words obtained from the look-up tables;

deriving from each segment of the resultant word a value for an element of the output vector as a result of operation of a respective output function.

2. A method as in claim 1, wherein the input functions are identity functions.

3. A method as in claim 1, wherein in the output functions are identity functions.

4. A method as in claim 1, wherein the step of deriving obtains values for elements of the output vector from look-up tables according to values of the segments of the resultant word.

5. A method as in claim 1, wherein the input vector has four elements, and the matrix is a four-by-four matrix.

6. A method as in claim 1, wherein the step of generating the look-up tables includes calculating a product of an element of the matrix and a result of operation of a respective input function on a specific possible value of an element of the input vector, shifting and scaling said calculated product, and storing said shifted and scaled product into a corresponding segment of a word in a look-up table.

7. A method as in claim 6, wherein the step of deriving includes counter-shifting and rescaling the segments of the resultant word to compensate for the shifting and scaling in the step of generating the look-up tables, and operating a respective output function on the counter-shifted and rescaled segments of the resultant word.

8. A method as in claim 7, wherein the step of deriving performs the counter-shifting, rescaling, and operation of the respective output function by using a second plurality of look-up tables generated in the step of generating.

9. An apparatus for transforming an input vector having multiple vector elements by sequential operation of a set of input functions operating on respective vector elements, a matrix, and a set of output functions operating on respective vector elements to generate an output vector, comprising: a memory; a processor coupled to the memory for reading from and writing to the memory, the processor including means for generating and storing a plurality of look-up tables in the memory, each look-up table associated with a vector element of the input vector and a corresponding column in the matrix, said each look-up table comprising a plurality of words each corresponding to a possible value of said associated vector element and having multiple segments each representing a product of a matrix element in said associated column of the matrix and a result of operation of a respective input function on said possible value of said associated vector element; the processor further including means for obtaining from the look-up tables words corresponding to values of the vector elements of the input vector; means for adding the words obtained from the look-up tables to generate a resultant word having segments corresponding to the segments of the words obtained from the look-up tables; and means for deriving from each segment of the resultant word a value for an element of the output vector as a result of operation of a respective output function.

10. An apparatus as in claim 9, wherein the input functions are identity functions.

11. An apparatus as in claim 9, wherein in the output functions are identity functions.

12. An apparatus as in claim 9, wherein the input vector is a color vector of a pixel of a digital image stored in the memory.

13. An apparatus as in claim 9, wherein the means for generating the look-up tables scales and shifts a product of a matrix element and a result of operation of a respective input function on a possible value of a vector element of the input vector and stores the scaled and shifted product into a corresponding segment of a word in a look-up table.

14. An apparatus as in claim 13, wherein the means for deriving performs counter-shifting and resealing of the segments of the resultant word to compensate for the shifting and scaling performed by the means for generating the look-up tables.

15. An apparatus as in claim 14, wherein the means for deriving obtains values for the elements of the output vector from look-up tables according to the values of the segments of the resultant word.

16. A method of modifying colors of a digital image having multiple pixels according to a transformation operable on a color vector having multiple vector elements by sequential operation of a set of input functions operating on respective vector elements, a matrix, and a set of output functions operating on respective vector elements, comprising the steps of:

generating in a memory of the computer a plurality of look-up tables each associated with a vector element of the color vector and a corresponding column of the matrix, said each look-up tables comprising a plurality of words each corresponding to a possible value of said associated vector element and having multiple segments each representing a product of a matrix element in said associated column and a result of operation of a respective input function on the possible value of said associated vector element;

for each of the pixels of the digital image:

retrieving an original color vector of said each pixel;

obtaining from the look-up tables words corresponding to values of respective elements of the original color vector;

adding the words obtained from the look-up tables to generate a resultant word having segments corresponding to the segments of the words obtained from the look-up tables;

deriving from each segment of the resultant word a value for an element of a transformed color vector of said each pixel of the digital image as a result of operation of a respective output function.

17. A method as in claim 16, wherein the transformation matrix is a four-by-four matrix, and the color vector has four vector elements.

18. A method as in claim 17, wherein the color vector is a pre-multiplied RGBα vector.

19. A method as in claim 16, wherein the input functions are identity functions.

20. A method as in claim 16, wherein the output functions are identity functions.

21. An apparatus for modifying colors of a digital image having multiple pixels according to a transformation operable on a color vector having multiple vector elements by sequential application of a set of input functions operating on respective vector elements, a matrix, and a set of output functions operating on respective vector elements, comprising: a memory for storing the digital image; a processor coupled to the memory for reading from and writing to the memory, the processor including means for generating and storing a plurality of look-up tables in the memory, each look-up table associated with a vector element of the color vector and a corresponding column of the matrix, said each look-up table comprising a plurality of words each corresponding to a possible value of said associated vector element and having multiple segments each representing a product of a matrix element in said associated column and a result of operation of a respective input function on said possible value of the associated vector element; the processor further including means for retrieving an original color vector elements of a pixel of the digital image; means for obtaining from the look-up tables words corresponding to values of elements of said original color vector, means for adding the obtained words to generate a resultant word having segments corresponding to the segments of the obtained words; and means for deriving from each segment of the resultant word a value for an element of a transformed color vector of said each pixel of the digital image as a result of operation of a respective output function.

22. An apparatus as in claim 21, wherein the transformation matrix is a four-by-four matrix, and the color vector has four elements.

23. An apparatus as in claim 22, wherein each pixel of the digital image is stored in the memory as a pre-multiplied RGBα vector.

24. An apparatus as in claim 21, wherein the input functions are identity functions.

25. An apparatus as in claim 24, wherein the output functions are identity functions.

* * * * *

UNITED STATES PATENT AND TRADEMARK OFFICE
CERTIFICATE OF CORRECTION

PATENT NO. : 5,880,744
DATED : March 9, 1999
INVENTOR(S) : Bradstreet

It is certified that errors appear in the above-identified patent and that said Letters Patent is hereby corrected as shown below:

In Column 4, Line 46, "$R_n$" should read --$r_n$--.

IN THE CLAIMS:

In Claim 7, Line 2, "resealing" should read --rescaling--.

In Claim 8, Line 2, "resealing" should read --rescaling--.

In Claim 14, Line 2, "resealing" should read --rescaling--.

Signed and Sealed this

Tenth Day of October, 2000

Attest:

Attesting Officer

Q. TODD DICKINSON
Director of Patents and Trademarks